United States Patent Office 3,196,166
Patented July 20, 1965

3,196,166
COMPLEX ALKYL TITANATE DERIVATIVES AND THEIR MODIFICATIONS
Max Kronstein, New York, and William H. Kapfer, Hastings on Hudson, N.Y., assignors, by mesne assignments, to the United States of America as represented by the Secretary of the Navy
No Drawing. Filed May 17, 1962, Ser. No. 195,649
18 Claims. (Cl. 260—347.8)

This invention relates to novel methods for the preparation of new types of titanium organic compounds. More particularly, it concerns complex metallic titanate products formed from the reaction between alkyl titanates and metallic salts of organic acids.

The titanates have the formula $Ti(OR)_4$, wherein R may be alkyl or aromatic, and are considered to be derivatives of $TiCl_4$. Heretofore, the alkyl titanates have been found to have little usefulness because of their tendency to hydrolyze in the presence of minute traces of water to form titanic gel. Many attempts were made to improve the hydrolytic stability of these compounds without success. It was found that merely lengthening the R grouping had little or no effect on improving the stability of the titanates.

Accordingly, it is an object of this invention to provide new complex alkyl titanate reaction products which will have an improved hydrolytic stability and which will have a fire point of about 600° F.

Another object is to provide a readily adaptable and commercially utilizable method for preparing and modifying complex alkyl metallic titanate reaction products possessing unique lubricating characteristics.

A further object of this invention is to produce such reaction products which can be chemically modified to provide a group or resinous compositions of controlled structure and molecular weight having reproducible chemical and physical properties.

Further objects and advantages of the invention will appear hereinafter.

In accordance with this invention, an alkyl titanate is reacted with a metallic derivative of an organic acid, containing at least five carbon atoms whereby a portion of the metal remains in its basic form forming a covalent bond with the metallic derivative. Metals which are capable of forming such compounds come from the group consisting of cobalt, lead and zinc.

Upon mixing the alkyl titanate and the metal acid derivative, containing at least some amount of the basic form of that derivative, heat is evolved and a complex compound, which contains titanium as well as the other metal, is formed.

The reaction product is separated from by-products such as any alcohols liberated from the alcohol groups present in the original alkyl titanate and from any part of the organic component of the other organic metal derivatives through a vacuum distillation.

In a more specific and preferred embodiment, the invention comprises reacting a tetraisopropyl titanate with the basic zinc derivative of the 2 ethyl hexanoic acid, which is known as a basic zinc octoate. The resulting product is a fluid at room temperature, and it is obtained as the major high-temperature product of the vacuum distillation.

This invention is further illustrated by the following examples.

Example I 270 grams of tetraisopropyl titanate are mixed with 857 grams basic zinc octoate which may be formulated empirically as follows:

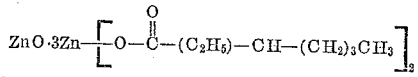

The mixture is refluxed and distilled using a gradual temperature increase so that the distillation product should start to come over at a very slow speed. Good results have been obtained by holding the temperature of the vapors which enter the cooling system for the first 30 to 50 minutes below 100° C. Then the rate of reaction can be increased to remove the low boiling cuts which are distilled below a temperature of 280° C. at a pressure of 1 to 10 mm. of mercury. After removal of the low boiling materials the reaction product distills between 280° and 350° C. This temperature range depends upon the pressure variations. The complex zinc alkyl titanate reaction product is obtained as a transparent, yellow to golden, moderate to highly viscous fluid. The residue remaining in the distillation flask is a dark resinous material.

Example II

A similar reaction product can be obtained based on lead instead of zinc. Lead oxide is reacted with 2 ethyl hexanoic acid, and a compound is obtained containing about twenty-four percent lead. When 4 moles of this lead octoate is reacted with 1 mole of tetrabutyl-titanate, and the mixture subjected to a vacuum distillation, a complex lead alkyl titanate reaction product is formed. This product distills under a pressure of 5 mm. Hg at a temperature between 300° and 340° C. This is a very viscous material which might, after cooling, appear to be nearly a solid material.

Example III 83 grams of cobalt octoate (208 grams of a commercial cobalt octoate solution containing 40% solids and 6% cobalt) is mixed with 30 grams of tetraisopropyl titanate. After refluxing the mixture for one hour, about 60 milliliters of the viscous, strongly colored titanate cobalt complex reaction product was recovered as the distillate when the temperature reached 290° C. under a pressure of 5 mm. of mercury.

The following table shows the improved physical properties of the metal titanate complexes produced according to the methods described in the hereinabove examples, over the alkyl titanates.

|  | Viscosity,[1] cps. | Fire Point,[1] ° F. | Water Stability |
|---|---|---|---|
| Alkyl titanate[1] | 1 | Below 200 | Hydrolyze immediately on contact with water into a white solid matter. |
| Metal titanate complex. | Over 1,000 | 600 | Can be stored in open containers and show in contact with water, no white product. |

[1] The alkyl titanate used was tetraisopropyl titanate. The viscosity tests were conducted at room temperature. The flame or fire points were tested by the A.S.T.M. Open Cup Method.

Tetraisopropyl titanate does not exhibit any useful lubricity results when tested with the Shell four ball wear tester due to its hydrolyzing during the test. On the other hand, the titanium-zinc complex reaction product of Example I shows at 60° C., under a load of 20 kgs. in a 30 minute test, scar marks on the steel balls of the test generally below 0.400 mm. This indicates a good lubricating effect.

When the titanium-metal complex reaction products are redistilled at atmospheric pressure, they show considerably greater heat stability than the initial alkyl titanate. The titanium-zinc complex of Example I was subjected to a gradual increase in temperature at atmospheric pressure, the first drop of a distillate came over as a clear distillate at 768° F. After heating the product for three and one-half hours and increasing the temperature to 834° F., thirty-three percent of the material had come over leaving a solid grey residue in the flask.

In a similar manner the titanium cobalt complex of Example III showed only a small amount of a clear yellow distillate between 572° F. and 705° F. with a stronger distillation taking place between 750° F. and 825° F. at one atmosphere.

If small amounts of a free energy reaction type catalyst, such as one from the group consisting of aluminum chloride, stannic chloride and antimony chloride, are added to the reaction mixture of the alkyl titanate and the metal octoate, a more uniform product is produced because of a more complete interreaction between the alkyl titanate and the metal octoate. Under an emission spectrograph the product of Example I, when produced in the presence of a small amount of aluminum chloride, showed a more stable ratio between titanium and zinc.

The titanium metal complex compounds produced hereinabove still exhibited some residual reactivity which appeared in the form of a heat evolution when they were mixed with certain alcohols or other reactive fluids. It is possible to utilize such residual reactivity for a modification of the complexes into one or more different derivatives which have the same basic characteristics as those shown by the primary complexes; however, the modifications which are described in the following examples do show increased resistance toward oxidation.

*Example IV*

850 grams of the titanium zinc complex of Example I is mixed with 250 grams of benzyl alcohol.

Other alcohols which can be substituted for the benzyl alcohol are ones from the group consisting of phenyl ethyl alcohol, 3 phenyl 1 propanol and other alcohols which contain at least one phenyl group but where the OH grouping is not attached directly to the phenyl grouping.

The reason that alcohols are selected wherein the phenyl grouping is not attached directly to the OH grouping is that phenols and substituted phenols produce strongly colored fusible solids when reacted with titanates.

On mixing the benzyl alcohol and the titanate zinc complex, there develops a slight temperature increase. The mixture is slowly heated to complete the reaction. Under a pressure of 1 mm. of mercury, a low cut below 250° C. is distilled. The temperature is raised to above 300° C. at a pressure of 2 mm. Hg and the modified titanate zinc complex distills between 300° C. and 350° C.

*Example V*

Instead of modification with an alcohol containing a phenyl grouping, it is possible to use a furfuryl alcohol. 400 grams of the titanium lead complex of Example I was modified by mixing it with 120 grams of tetrahydrofurfuryl alcohol. The distillation procedure follows that employed in Example IV.

*Example VI*

In another form of modification, the titanium metal complex reaction product is mixed with an ether containing a phenyl group such as phenyl ether, n-butyl phenyl ether and other ethers from this class of ethers. 300 grams of the titanium zinc complex are mixed with 115 grams of phenyl ether. The mixture is subjected to a distillation as described hereinabove and the modified reaction product is obtained between 300° C. and 350° C. under a pressure of 2 to 10 mm. Hg.

*Example VII*

The titanium metal reaction products produced by the procedures described under Examples I, II and III can be further modified by treating them with ones from a group of compounds known as tetra alkyl silanes. These compounds have the following formula:

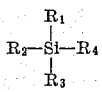

wherein R is an alkyl group.

One mole of the titanium zinc complex of Example I was codistilled with one mole of di octyl-di dodecyl silane. A new low distillation product was separated and the new modified reaction product was obtained as the high distillation cut. The separation of the low cut product can be made more complete by adding a low distillation range product to the reaction mixture. An example of such a solvent is a mixture of benzene and acetone. The low cut product will be carried by the solvent distilling from the reaction mixture.

*Example VIII*

454.5 grams of the zinc titanium product of Example I are mixed with 182 grams of amyl triethoxysilane. No heat was developed on mixing. During the vacuum distillation, the high temperature cut of the reaction product is obtained between 275° C. and 290° C. at 2.5 mm. Hg pressure. Similar tests were made with dimethyl diethoxy silane.

Because of the silicon content of these products, a somewhat stronger scar mark of 0.4440 mm. for the silane modified product is produced on the Shell four-ball wear test than was produced (.400 mm.) by the basic titanium zinc complex reaction product.

In another form of modification, 79 grams of tetraisopropyl titanate, 415 grams of basic zinc octoate and 74 grams of an ethoxy silane are mixed together into a distillation flask. The high cut reaction product was obtained between 305° C. and 315° C. at 2–3 mm. of mercury.

When 150 grams of the zinc reaction product of Example I was mixed with 75 grams of a triethoxy silane which contains an amino group on an aliphatic chain and when in a vacuum distillation the low temperature cuts were removed (up to 140° C. at 6 mm. Hg pressure), there remained in the flask a residue which on cooling yielded a resin (160 grams yield) which was soluble in hot xylol and was compatible with tungoil. On curing at around 100° C. a highly coherent and adherent resin coating was obtained on steel.

*Example IX*

When a mixture of 88 grams tetraisopropyl titanate and 520 grams of basic zinc octoate were reacted in the presence of 85 grams of aluminum isopropylate, heat was evolved on mixing; and 300 ml. of a high temperature cut was obtained at 2 mm. Hg pressure between 310° C. and 360° C. as a clear yellow fluid which had an A.S.T.M. Open Cup flame point between 580° F. and 600° F.

A mixture of 100 grams of basic zinc octoate, 200 grams of tetraisopropyl titanate and 100 grams of aluminum secondary butoxide diisopropoxide was placed into a distillation flask. A low temperature cut was distilled up to approximately 150° C. whereupon the pot content gelled into a greenish solid, which was soluble in benzyl alcohol and produces on curing a hard resinous coating on steel. Such resins, which are complexes between the organo derivatives of different elements, are highly complexed materials and show considerable resistance to high temperature applications.

The modifications of the titanium metal complex reaction products described in Examples IV through IX have an A.S.T.M. Open Cup flame point not much different from that of the initial compounds in accordance with Examples I through III. Each of these modifications shows in the infrared region its specific spectrum, with differences noted especially in the band areas around 6.15 microns. They are therefore identified as different materials. Other modified substances can be produced by selecting different modifying agents. Additional evidence of this fact is that each of these different modification products influences certain properties of the other product; for example, if the modified products of more than one of the above examples are mixed together, their mixture shows a lower pour point than each of these materials would show individually. This lowering of the pour point is maintained even after such mixtures have been heated together to a temperature of around 200° C. and above.

Examples VIII and IX are described to show a procedure for lowering the viscosity of the titanium-metal complex reaction products by combining them with other fluids which act as solvent-type additives and which have for themselves a high enough flame point and a low enough pour point not to interfere with the usefulness of the products obtained from the preceding examples. Such additives can be selected from the groups of the petrochemical synthetic hydraulic fluids and from the group of commercial silicone fluids which might be identified as a group of materials based on dimethyl silicones with some phenyl grouping introduced for increasing their heat stability. Where such fluids have for themselves the required heat stability to limit the properties of the fluids of this invention, they can be first modified so as to increase their own oxidation resistance at a higher temperature before using them as diluents. Such modifications might be referred to as "inhibited silicone fluids." This might refer to such fluids which have been heat exposed with cerium octoate additive or other cerium organic additive, in presence of a Schiff's base or inhibited by other means.

That the compounds of the hereinabove examples contain the organic matter with titanium as well as the other metal, for instance zinc, can be established by their emission spectrum which shows that both metals are present. Alternatively, the compounds can be mixed with concentrated sulfuric acid which causes a rise in temperature. When water is added, layers are formed which can then be separated into an organic layer and a layer containing the metal sulfates. The metals can be identified analytically.

These new complexes along with their modifications and derivatives find use, depending on their nature, as hydraulic fluids and lubricants and as base materials for the production of resinous materials. They can be used for themselves in mixtures, in reaction products with other organic materials, as well as with organic derivatives of metals and other elements such as phosphates. It is obvious, then, that these products of our invention are new, much needed and important articles of commerce and that the novel processes whereby we prepare them is a surprisingly simple and ingenious one.

We claim as our invention:
1. A method for the preparation of a complex metallic titanate composition which comprises:
    (a) admixing an alkyl titanate, having the general formula of $Ti(OR)_4$ wherein R is an aliphatic hydrocarbon containing from 1 to 4 carbon atoms with a metal octoate, said octoate being one member selected from a group consisting of zinc octoate, lead octoate and cobalt octoate;
    (b) subjecting the said titanate and the said metal octoate to a distillation below 280° C. whereby low boiling fractions are removed and
    (c) isolating the reaction product as a distillate between a temperature range of 280° and 350° C. at a pressure of 1 to 10 mm. of mercury.
2. A method according to claim 1, further including the step of subjecting the reaction product to a vacuum distillation in order to obtain it in a further purified form.
3. A method according to claim 1 in which the alkyl titanate employed is tetraisopropyl titanate and the metal octoate employed is zinc octoate.
4. A method according to claim 1 in which the alkyl titanate employed is tetrabutyl titanate and the metal octoate employed is lead octoate.
5. A method according to claim 3 in which the metal octoate employed is cobalt octoate.
6. The product formed by the method according to claim 1.
7. The method according to claim 1 including the additional steps of:
    (a) mixing the reaction product thereof with an alcohol selected from the group consisting of benzyl alcohol, phenyl ethyl alcohol, 3-phenyl-1-propanol and tetrahydrofurfuryl alcohol;
    (b) isolating a distillate of the said mixture between the temperature range of 300° and 350° C. at a pressure of 2 mm. of mercury.
8. A method according to claim 7 in which the alcohol is benzyl alcohol.
9. A method according to claim 7 in which the alcohol is tetrahydrofurfuryl alcohol.
10. A product produced according to the method of claim 7.
11. The method according to claim 1 including the additional steps of:
    (a) mixing the reaction product thereof with an ether selected from the group consisting of phenyl ether and n-butyl phenyl ether;
    (b) isolating a distillate of the said mixture between the temperature range of 300° and 350° C. at a pressure of 2 to 10 mm. of mercury.
12. A reaction product formed according to the method of claim 11.
13. The method according to claim 1 including the additional steps of:
    (a) mixing the reaction product thereof with a member being selected from a group of compounds known as tetra silanes, said silanes having the general formula

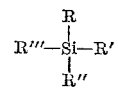

where R, R', R'', and R''' is an aliphatic hydrocarbon containing from 2 to 18 carbon atoms;
    (b) isolating a distillate of the said mixture between the temperature range of 275° and 290° C. at a pressure of 2.5 mm. of mercury.
14. A method according to claim 13 in which the tetra silane is di octyl-di dodecyl silane.
15. A method according to claim 13 in which the tetra silane is triethoxysilane.
16. A reaction product formed according to the method of claim 13.

17. The method according to claim 1 including the additional steps of:
(a) mixing the reaction product thereof with aluminum isopropylate;
(b) isolating a distillate of the said mixture between the temperature range of 310° and 360° C. at a pressure of 2 mm. of mercury.

18. A reaction product formed according to the method of claim 17.

No references cited.

CHARLES B. PARKER, *Primary Examiner.*
ABRAHAM H. WINKELSTEIN, *Examiner.*